(12) United States Patent
Garner

(10) Patent No.: US 6,576,577 B1
(45) Date of Patent: Jun. 10, 2003

(54) UNDERLAYMENT FOR FLOOR COVERINGS

(75) Inventor: Kenneth B. Garner, Ringgold, GA (US)

(73) Assignee: Foam Products Corporation, Calhoun, GA (US)

(*) Notice: Subject to any disclaimer, the term of this patent is extended or adjusted under 35 U.S.C. 154(b) by 0 days.

(21) Appl. No.: 09/326,383

(22) Filed: Jun. 4, 1999

Related U.S. Application Data
(60) Provisional application No. 60/110,690, filed on Dec. 3, 1998.

(51) Int. Cl.[7] .............. B32B 5/18; B23B 3/26; E04E 15/22
(52) U.S. Cl. ............ 442/374; 442/370; 442/401; 428/304.4; 52/403.1
(58) Field of Search .............. 442/370, 374, 442/401; 428/304.4; 52/403.1

(56) References Cited

U.S. PATENT DOCUMENTS

| | | |
|---|---|---|
| 3,772,224 A | 11/1973 | Marlin et al. |
| 3,849,156 A | 11/1974 | Marlin et al. |
| 3,900,656 A | 8/1975 | Schmidt |
| 3,947,386 A | 3/1976 | Prokai et al. |
| 4,022,722 A | 5/1977 | Prokai et al. |
| 4,022,941 A | 5/1977 | Prokai et al. |
| 4,191,798 A | 3/1980 | Schumacher et al. |
| 4,241,131 A * | 12/1980 | Bailey .................. 264/257 |
| 4,360,554 A | 11/1982 | Campbell et al. |
| 4,379,190 A | 4/1983 | Schenck |
| 4,438,228 A | 3/1984 | Schenck |
| 4,483,894 A * | 11/1984 | Porter et al. ............ 427/244 |
| 4,990,399 A * | 2/1991 | Hoopengardner ...... 428/317.3 |
| 5,116,439 A | 5/1992 | Raus |
| 5,501,895 A | 3/1996 | Finley et al. |
| 5,536,556 A * | 7/1996 | Juriga .................... 428/138 |
| 5,578,363 A | 11/1996 | Finley et al. |
| 5,617,687 A * | 4/1997 | Bussey, Jr. et al. ...... 52/404.2 |
| 5,854,144 A * | 12/1998 | Hawley ................... 442/56 |
| 5,968,630 A * | 10/1999 | Foster .................... 52/408 |
| 6,189,279 B1 * | 2/2001 | Fiechtl ................... 52/403.1 |

OTHER PUBLICATIONS

"Underlayment Tops Laminate News," The Silencer™ Makes Big Noise, Foam Products Newsletter; (Jun. 5, 1998).
The Silencer ™, advertisement in Floor Covering Weekly (Issue dates: Mar. 30, 1998 and May 4, 1998).
The Silencer™ Features and Benefits and Product Specifications, test results showing average of several major brand name laminate floors, Foam Products, Calhoun, Georgia (no date available).

(List continued on next page.)

Primary Examiner—Elizabeth M. Cole
Assistant Examiner—Jenna-Leigh Befumo
(74) Attorney, Agent, or Firm—Bruce D. Gray; Kristin D. Mallatt; Kilpatrick Stockton LLP

(57) ABSTRACT

An underlayment material is disclosed for use as an underlayment in a non-textile flooring system. The underlayment material comprises a thin, flexible layer of polyurethane foam and a thin, flexible substrate layer bonded to one side of the layer of polyurethane foam. In a preferred embodiment, the underlayment material is a mechanically frothed polyurethane foam. In another preferred embodiment, the substrate layer is a layer of non-woven spun bonded polyester fibers. In another preferred embodiment, the underlayment material has a thickness of between about 0.05 and 0.125 inches, and most preferably, about 0.085 inches. In still another preferred embodiment, the foam has a fine cell structure and a density of between 10 and 30 pounds per cubic foot, and most preferably about 20 pounds per cubic foot. In still another preferred embodiment, the foam has a compression set of between about 5% and 25%, and most preferably about 10%.

11 Claims, 2 Drawing Sheets

OTHER PUBLICATIONS

The Silencer™ Features and Benefits and Product Spercifications, test results conducted using Mannington laminate flooring, Foam Products, Calhoun, Georgia (no date available).

The Silencer™ Features and Benefits and Product Specifications, test results conducted using Wilsonart® Flooring laminate floors, Foam Products, Calhoun, Georgia (no date available).

The Silencer™ Features and Benefits and Product Specifications, test results conducted using WITEX laminate floors, Foam Products, Calhoun, Georgia (no date available).

The Silencer™ Features and Benefits and Product Specifications, test results conducted using UNIBOARD CANADA, Multilook® laminate floors, Foam Products, Calhoun, Georgia (no date available).

The Silencer™ Features and Benefits and Product Specifications, test results conducted using Bruce® Traffic Zone laminate flooring, Foam Products, Calhoun, Georgia (no date available).

The Silencer™ Features and Benefits and Product Specifications, test results conducted using Bruce® Coastal Woodlands Hardwood Flooring, Foam Products, Calhoun, Georgia (no date available).

The Silencer ™ Specifications Testing Sources, Foam Products, Calhoun, Georgia (no date available).

The Silencer™ Installations Instructions, Foam Products, Calhoun, Georgia (no date available).

The Silencer™ Actual Labels Used in Packaging, Foam Products, Calhoun, Georgia (no date available).

The Silencer™ Foam Products Corp., Calhoun, Georgia, Regular Pricing Schedule To Manufacture, Distributor, Retail Dealer, (no date available).

The Silencer™ Foam Products Corp., Calhoun, Georgia, Regular Pricing Schedule To Retail Dealer and Consumer (no date available).

Foam Products Corporation Warranty for the Silencer™, Calhoun, Georgia (no date available).

Copy of actual The Silencer™ underlayment, with product specification, Foam Products Corporation, Calhoun, Georgia (no date available).

* cited by examiner-

UNDERLAYMENT FOR FLOOR COVERINGS

This application claims priority to, and incorporates herein by reference, co-pending United States provisional patent application Serial No. 60/110,690, filed Dec. 3, 1998.

FIELD OF THE INVENTION

The present invention relates generally to the field of floor covering underlayments and floor covering systems that include floor covering underlayments. In particular, the invention is directed to a floor covering underlayment that comprises a polyurethane foam material, and floor systems that include such an underlayment.

BACKGROUND OF THE INVENTION

It has long been common practice in the flooring industry to use underlayment materials between a subfloor and a non-textile floor covering installed onto the subfloor. Such non-textile floor coverings include, for instance, vinyl tile floors, sheet vinyl floors, linoleum floors, hardwood floors and various other types of laminated floors.

The underlayment material can serve one or more of a variety of different functions in a given installation. In some installations, the function of the underlayment material is to provide a cushioning effect to the floor system. In other situations, the function of the underlayment material is to compensate for imperfections in the surface of the subfloor, which can be concrete, plywood, or a number of other different materials that are commonly used and known. Another function of the underlayment, which is particularly pertinent to the present invention, is to reduce the transmission of sound through the floor to a room below in a multi-floor building. This is particularly significant where the maximum allowable level of sound transmission is controlled by local building codes, which is increasingly common.

A variety of different underlayment materials have been developed in the past. Perhaps the most widely used underlayment material has been a simple polyethylene foam material. Other products have been made in which a polyethylene foam is coated on one side with a polyethylene film as a moisture barrier. Other products have been made using polystyrene foams, some of which have included foil or mylar coatings on one side of the material. Products have also been made using re-ground rubber buffings adhered to a substrate. One such product has been marketed under the trademark DURASON by Durie of Montreal, Canada. Other products have been made using slab rubber, for example, a product marketed under the trademark TREAD-AIRE, by Gates Rubber, located in the United Kingdom. The TREAD-AIRE product comprises a rubber sheet, with a substrate material on one side. Underlayment products have also been manufactured from compressed cellulose.

While all of the aforementioned products have proven useful in various circumstances, they all have substantial disadvantages or drawbacks. For example, while polyethylene foam underlayment materials are effective in smoothing imperfections on the subfloor surface, such products are relatively ineffective in reducing the transmission of sound through the floor to a room below in a multi-story building. The same is true for the various coated polyethylene and polystyrene foam products that have been developed. While slab rubber and compressed cellulose products are effective to some extent in reducing the transmission of sound through the floor to a room below, they are relatively difficult to handle and install. For instance, products made from slab rubber tend to be quite heavy as compared to the lighter foam products, and are therefore more difficult to carry and install. Compressed cellulose products are generally provided in the form of rigid square tiles. As a result, the installation of such products is more difficult than other products that can simply be rolled into place. In addition, the slab rubber and compressed cellulose products tend to be quite thick, on the order of 0.180 inches or greater. In situations where a new floor is to be installed into a pre-existing building, the use of such a thick underlayment can raise the level of the floor to an extent that makes it necessary to remove and reposition the existing baseboards and moldings around the floor.

In view of these shortcomings in the existing underlayment products, there is a need in the industry for an improved underlayment material that is relatively thin and easy to install, that can be provided to end users in the form of a roll, that is capable of smoothing imperfections in the subfloor, that is capable of providing a cushioning effect for the floor structure, and that is capable of substantially reducing the transmission of sound through the floor to a room below in a multi-story structure. These and a number of additional objectives are met by the present invention.

SUMMARY OF THE INVENTION

In a basic aspect, the present invention is a polyurethane foam underlayment material for use with non-textile floors, and includes flooring systems that incorporate such underlayment materials. In one embodiment, the foam is a mechanically frothed polyurethane foam. In a particularly preferred embodiment, a fabric layer, such as a layer of non-woven spun bonded polyester fibers, is bonded as a substrate to one of the primary surfaces of the polyurethane foam.

The underlayment material is provided in the form of a thin, flexible sheet, which can be provided to an end user in the form of a roll and unrolled easily over the subfloor. Thus, it is at least as easy to install as any existing products. It is also relatively lightweight, reducing shipping costs and making the product easier to handle as compared to some other types of products. The underlayment is effective at smoothing imperfections in the subfloor and providing a cushioning effect for the floor structure. Surprisingly, while the product is much thinner than most underlayment products, it is excellent at reducing sound transmission through the floor to a room below in a multi-story structure.

DETAILED DESCRIPTION OF A PREFERRED EMBODIMENT

Figure 1:
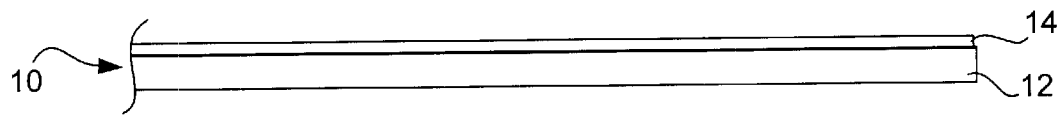
FIG. 1 of the drawing is a cross-sectional view of an underlayment material in accordance with the present invention.

FIG. 1 shows the details of one particular embodiment of an underlayment product 10 in accordance with the present invention. As shown in FIG. 1, the underlayment product 10 is provided in the form of a flexible sheet, which includes a layer 12 of polyurethane foam and a substrate layer 14 bonded to or embedded into one outer surface of the layer 12. In a preferred embodiment, the polyurethane layer 12 comprises a mechanically frothed polyurethane foam material and the substrate layer 14 is a fabric made of non-woven spun bonded polyester fibers, such as the type of fabric that is commonly used to make fabric softener sheets for use in household clothes dryers.

Figure 2:
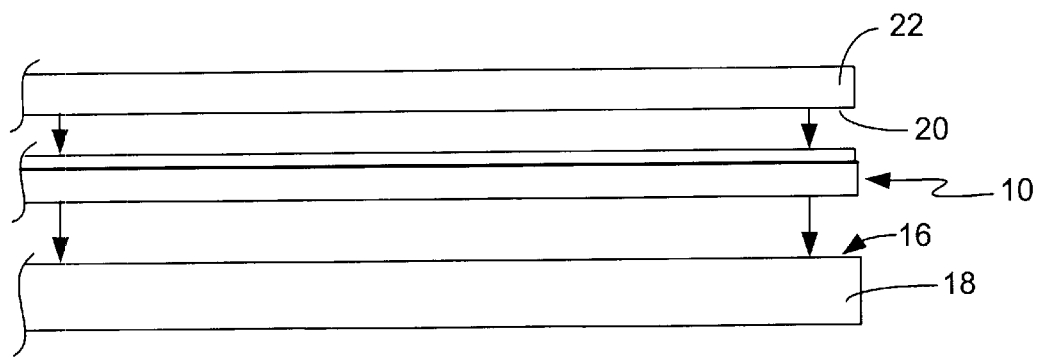
FIG. 2 of the drawing is an exploded cross-sectional view of a flooring system that incorporates the underlayment material of FIG. 1.

As shown in FIG. 2, the underlayment 10 is installed between the upper surface 16 of a subfloor 18 and the lower surface 20 of a floor covering material 22. The underlayment, when installed, forms part of a floor covering system in which the subfloor 18 may be anything from concrete to an old floor material to materials such as particle board, flake board, strand board, etc., and the floor covering material may be any of a wide variety of non-textile materials.

The product 10 is relatively thin as compared to other products, on the order of between about 0.05 and 0.125 inches, and preferably about 0.085 inches. Surprisingly, even at a thickness as low as 0.085 inches, the underlayment of the present invention provides superlative reduction in sound transmission through the floor to a room below. For example, using the ASTM E492-90 Impact Sound Transmission test procedure, the sound suppression capabilities of the underlayment was tested using a variety of commercial floor covering materials. The results, expressed in terms of the insulation impact classification (IIC), were as follows:

| | |
|---|---|
| MANNINGTON floor covering | IIC 58 |
| WILSONART floor covering | IIC 57 |
| WITEX laminate flooring | IIC 56 |
| UNIBOARD CANADA MULTILOCK laminate floor | IIC 56 |
| BRUCE TRAFFIC ZONE laminate flooring | IIC 58 |
| BRUCE COASTAL WOODLANDS hardwood flooring | IIC 56 |

The product 10 is made using any of a variety of well-known processes for forming polyurethane foams. In general, such processes are based on polymerization reactions involving one or more polyols and one or more isocianates. Various surfactants, catalysts, cross-linking agents and inert fillers are also used. Such processes are disclosed, for instance, in U.S. Pat. No. 3,772,224 (Marlin et al.) and U.S. Pat. No. 3,849,156 (Marlin et al.), both of which are incorporated herein by reference in their entirety.

In one process for manufacturing an underlayment in accordance with the present invention, a polyol, to which a cross-linking agent has already been added, is mixed with an isocianate in a mixing vessel. The mixture is then pumped into a turbolyzer, a paddle-like mixer with an auger system. An inert filler, in the form of a powder, is fed by auger into the turbolyzer. The material from the turbolyzer is then pumped into a frothing head. A surfactant and a heat-activated catalyst are added at the entrance of the frothing head.

Figure 3:
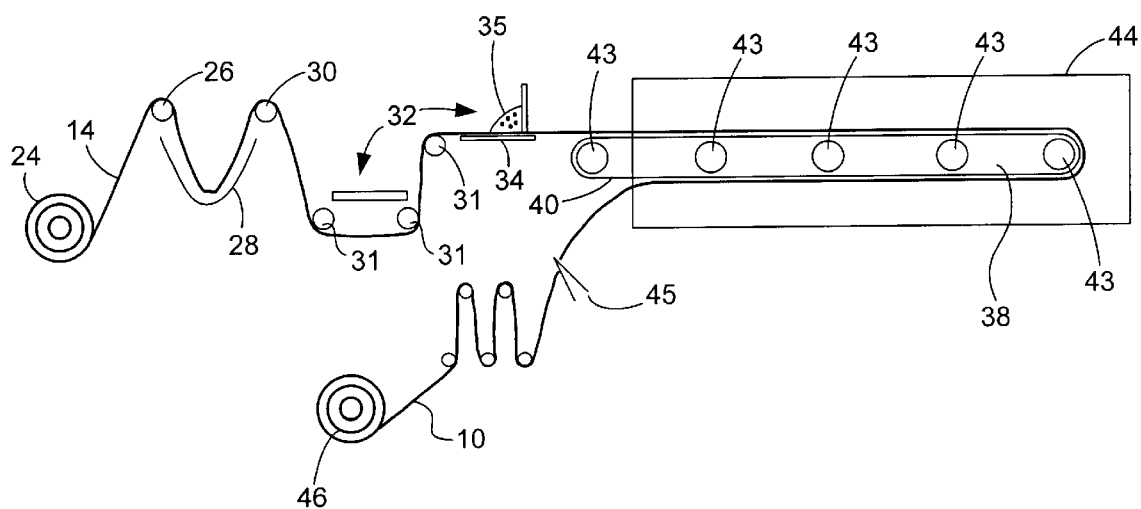
FIG. 3 of the drawing is a schematic representation of the process for forming an underlayment material in accordance with the present invention, starting with an uncured mixture of components.

As shown in FIG. 3, the frothed mixture of components, still in an uncured form, exits the frothing head and is poured onto a sheet of substrate material 14 that originates from a roll 24. Before the frothed mixture is deposited onto the substrate 14, the substrate is conveyed over a drive roller 26 into an accumulator 28. Another drive roller 30 draws substrate from the accumulator. The substrate then passes through a series of rollers 31 into a manned coating station 32, where the substrate 14 is carried over a bed plate 34. The uncured mixture is continuously deposited onto the substrate 14 at this point as it passes through the coating station, forming a pool 35 of uncured material against one side of a doctor bar 36. The doctor bar spreads the uncured mixture to a desired thickness on the substrate as the substrate passes under the doctor bar, forming a coating of the uncured components of uniform thickness across the entire surface of the substrate. The thickness of the coating of the uncured mixture can be adjusted by adjusting to height of the doctor bar above the substrate, so that the foam will have the desired thickness after curing. From the coating station, the coated substrate passes onto a tenter frame 38. The tenter frame 38 includes two loops of chains 40 and 42 (hidden behind chain 40 in FIG. 3) that are spaced apart from one another a distance slightly greater than the width of the final product. The coated substrate is held to the chains 40 and 42 by pins (not shown) mounted on a series of blocks (not shown) attached to the chains at intervals.

The chains are drawn continuously through a long gas-fired oven 44 on a series of gears and rollers 43, carrying the coated substrate through the oven. Within the oven, the uncured foam is exposed to a temperature of between about 260°–300° F., and preferably a temperature of about 280° F., with a resonance time of approximately 3 minutes. Within the oven, the catalyst is activated, thereby catalyzing the polymerization reaction between the polyol and the isocianate. The coated substrate passes to the far end of the oven 44, and then reverses course as the chain reverses direction at the end of the oven. The frothed mixture is cured inside the oven to form a continuous strip of underlayment material 10, which exits the oven at the same end where the coated substrate was introduced. Alternatively, the coated substrate can make only a single pass through the oven, exiting the oven at the opposite end from where the coated substrate was introduced.

The underlayment material 10 that exits the oven includes a layer 12 of polyurethane foam with a fine cell structure and a density of between 10 and 30 pounds per cubic foot, and preferably about 20 pounds per cubic foot, and a compression set of between about 5% and 25%, and preferably about 10%.

As it exits the oven 44, the strip of underlayment material proceeds through a cutting station 45, where the lateral edges of the strip are trimmed to take away the portion of the strip that was pinned to the tenter frame and to provide a uniformly smooth edge and a strip of a desired width. In one embodiment, the strip of underlayment 10 is cut to a width of about 54 inches. The strip of underlayment material is gathered onto a roll 46 and can be cut to a desired length, preferably of about 25 feet.

In a particularly preferred embodiment, the ingredients used in preparing the polyurethane foam are as follows:

| INGREDIENTS | PHR by Weight |
|---|---|
| Atlantis ™ Q-1000 Resin Polyether polyols (ARCO Chemical Company) | 70.0 |
| ARCOL ® Polyol 24–32 Polymer polyols, Alkenyl Modified Oxyalkylene Polymer (ARCO Chemical Company) | 24.0 |
| Diethylene Glycol-Industrial Grade (Occidental Chemical Corporation) | 6.0 |
| NIAX LG-5615, Nickel acetyl acetonate/polyol mixture (Osi Specialities, Inc.) | 2.0 |
| L-5614, Polyalkyleneoxidemethylsiloxane Copolymer, a Silicone Surfactant (Osi Specialties, Inc.) | 2.0 |

| INGREDIENTS | PHR by Weight |
|---|---|
| WF-70, Calcium Carbonate, Marble; Limestone; Dolomite (Georgia Marble Company) | 110.0 |
| Baytuft 751 Component A, Polymeric Diphenylmethane Diisocyanate (MDI)/(Modified Diphenyimethane Diisocyanate Prepolymer)-Blend (Bayer Corporation) | 44.0 |

In forming the uncured mixture of components prior to curing, the polyols (e.g., Atlantix Q-1000 polyol, ARCOL 24-32 polyol), diethylene glycol, catalyst (e.g., LC-5615) and silocone surfactant (e.g., L-5614) are thoroughly blended in blending tanks. The blended materials are fed to the turbolyzer at a continuous and accurately metered rate. The inert filler, e.g., WF-70 calcium carbonate, is also fed continuously to the turbolyzer at an accurately metered rate. The materials introduced into the turbolyzer are intimately blended as they pass through the turbolyzer. The fully compounded materials are pumped from the turbolyzer to an in-line holding tank, from which the fully compounded blend is continuously and accurately pumped to an impingement mixer, where the compounded blend meets the rest of the formulation components. All the formulation components then pass into the froth foam mix head, where all the components are thoroughly mixed and the froth is formed. After the full formulation compound exits the froth foam head, the frothed foam is transported through a flexible hose to the application doctor bar, where it is continuously and accurately metered onto the moving substrate, as described above.

In use, the underlayment material 10 is provided to an end user in the form a long roll. The material 10 is installed onto the upper surface 16 of a subfloor 18, with the substrate layer 14 facing upward. Adjacent pieces of the underlayment are positioned with their adjacent edges flush, without overlapping, and the seams may be taped using a standard polyethylene tape. The floor covering material 22 is then installed directly onto the underlayment material 10 in a normal manner.

What is claimed is:

1. An underlayment material for a non-textile flooring system, comprising:
   (a) a flexible layer of frothed, polyurethane foam with an open cell structure and a density between 10 and 30 pounds per cubic foot;
   (b) a flexible substrate layer bonded to one side of the layer of polyurethane foam to form a thin underlayment material that is between about 0.05 and 0.125 inches thick wherein in use the underlayment material provides at least one of (a) smoothing imperfections beneath the flooring system, (b) providing a cushioning effect for the flooring system, and (c) reducing sound transmission through the flooring system; and
   (c) a non-textile flooring system.

2. The underlayment material of claim 1, wherein the substrate layer is a layer of non-woven spun bonded polyester fibers.

3. The underlayment material of claim 1, wherein the underlayment material has a thickness of about 0.085 inches.

4. The underlayment material of claim 1, wherein the foam has a density of about 20 pounds per cubic foot.

5. The underlayment material of claim 1, wherein the foam has a compression set of between about 5% and 25%.

6. The underlayment material of claim 1, wherein the foam has a compression set of about 10%.

7. A non-textile flooring system comprising (a) an underlayment material comprising a flexible layer of polyurethane foam and a flexible substrate layer bonded to one side of the layer of polyurethane foam, wherein the underpayment material has a thickness of between about 0.05 and 0.125 inches thick, the foam is mechanically frothed polyurethane foam having a density between 10 and 30 pounds per cubic foot, and the substrate layer is a layer of non-woven spun bonded polyester fibers and (b) a non-textile flooring system.

8. The underlayment material of claim 7, wherein the foam has a density of about 20 pounds per cubic foot.

9. The underlayment material of claim 7, wherein the foam has a compression set of between about 5% and 25%.

10. The underlayment material of claim 7, wherein the foam has a compression set of about 10%.

11. A flooring system, comprising:
   (a) an underlayment material for a non-textile flooring system, the material comprising:
      (i) a flexible layer of mechanically frothed polyurethane foam with an open cell structure, a density between 10 and 30 pounds per cubic foot; and
      (ii) a flexible substrate layer bonded to one side of the layer of polyurethane foam to form an underlayment material that is between about 0.05 and 0.125 inches thick; and
   (b) non-textile flooring material for installation above the underlayment material.

* * * * *